United States Patent
Bekiares et al.

(10) Patent No.: US 9,467,972 B2
(45) Date of Patent: Oct. 11, 2016

(54) MULTICAST WIRELESS COMMUNICATION SYSTEM

(71) Applicant: MOTOROLA SOLUTIONS, INC, Schaumburg, IL (US)

(72) Inventors: Tyrone D Bekiares, Park Ridge, IL (US); Robert E Beach, Los Altos, CA (US); Bob Logalbo, Rolling Meadows, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 373 days.

(21) Appl. No.: 14/143,168

(22) Filed: Dec. 30, 2013

(65) Prior Publication Data

US 2015/0189621 A1    Jul. 2, 2015

(51) Int. Cl.
| | |
|---|---|
| *H04H 20/71* | (2008.01) |
| *H04W 72/00* | (2009.01) |
| *H04L 12/18* | (2006.01) |
| *H04N 21/61* | (2011.01) |
| *H04N 21/6405* | (2011.01) |
| *H04N 21/6338* | (2011.01) |

(52) U.S. Cl.
CPC .......... *H04W 72/005* (2013.01); *H04L 12/189* (2013.01); *H04N 21/6131* (2013.01); *H04N 21/6338* (2013.01); *H04N 21/6405* (2013.01)

(58) Field of Classification Search
CPC .................................................. H04W 72/005
USPC ......................................................... 370/312
See application file for complete search history.

(56) References Cited

U.S. PATENT DOCUMENTS

| | | |
|---|---|---|
| 2004/0125769 A1 | 7/2004 | Vare |
| 2007/0097932 A1 | 5/2007 | Shahid et al. |
| 2008/0144559 A1 | 6/2008 | Griswold et al. |
| 2009/0323531 A1 | 12/2009 | Matta |
| 2010/0043035 A1* | 2/2010 | Lebar ....................... H04N 7/10 725/95 |
| 2010/0254296 A1 | 10/2010 | Gould |

(Continued)

FOREIGN PATENT DOCUMENTS

| | | |
|---|---|---|
| AU | 2008338905 A1 | 6/2010 |
| WO | 2005046284 A2 | 5/2005 |
| WO | 2012082086 A1 | 6/2012 |

OTHER PUBLICATIONS

Martin, et al, "Multicasting Video in Dense 802.11g Networks Using Application FEC", Jul. 12, 2011; pp. 1-22.

(Continued)

*Primary Examiner* — Wei Zhao

(57) ABSTRACT

A method and apparatus for multicasting data streams in a wireless radio communication system are provided. A server assigns a plurality of data streams amongst RF resources. One or more points-of-access of the wireless radio communication system are operable to transmit each RF resource to mobile communication devices. Responsive to a request from a mobile communication device for a selected one of the plurality of data streams, the server identifies the points-of-access that have not been assigned, and hence cannot transmit, the RF resource to which the selected data stream is assigned. An access controller instructs those points-of-access to deny association to the mobile communication device. The server then multicasts the selected data stream to the mobile communication device through one of the remaining points-of-access that can transmit the selected RF resource.

20 Claims, 11 Drawing Sheets

(56) References Cited

U.S. PATENT DOCUMENTS

2011/0145875 A1* 6/2011 Kim .................. H04N 7/17318
                                                   725/110
2013/0243075 A1* 9/2013 Dalela ..................... H04L 65/80
                                                   375/240.01

OTHER PUBLICATIONS

PCT International Search Report Dated Mar. 17, 2015 for Counterpart Application PCT/US2014/067261.

* cited by examiner

MULTICAST WIRELESS COMMUNICATION SYSTEM

BACKGROUND OF THE INVENTION

Wireless communications systems, such as two-way radio systems, have to accommodate widely varying demands. One source of variation is the widely varying number of mobile communication devices that may wish to receive service from one access point, such as a base station, at different times. Another source of variation is the widely varying asymmetry between the amount of data that any particular user may download from an access point, and the amount of data that the same user may need to upload to the access point.

Some wireless communication systems such as LTE and 802.11 are able to provide high download speeds to multiple mobile communication devices, using over-the-air multicast/broadcast service. A typical application is the streaming of video. However, although multicast has been a part of the 802.11 standard since its inception, it is not widely deployed. Notably, it is useful only when a large audience is anticipated to view the same content at approximately the same time.

802.11 multicast includes no provisions for retransmission of lost packets. As a consequence, in a situation in which there is a random dispersion of mobile devices around an access point, a modulation of suitably low complexity must be selected, in order to ensure a relatively low packet error rate. For example, BPSK or QPSK modulation may be selected BPSK or QPSK modulation will, reliably, achieve a packet error rate of $10^{-3}$ or better. However, the use of a low complexity modulation, when applied to high data rate streams such as video, can result in very high channel utilization.

In some 802.11 systems, there may be multiple non-overlapping channels available in both the 2.4 and 5 GHz bands. Additionally, some known single access points may be able to provide service across multiple channels simultaneously, for example in one channel in the 2.4 GHz band and another channel in the 5 GHz band.

A mobile communication device can typically only maintain an association with a single access point and a single channel at a time. However, situations arise where there are a multitude of high data rate streams available to mobile communication devices. Since a network designer doesn't know which mobile stations are attached to which access points, and which high data rate streams they may want to consume, all such streams must presently be made available from all access points. Multiplexing and transmitting two or more high data rate streams on the same 802.11 channel using multicast with low complexity modulation, however, will require an appreciable reduction of quality of each stream. If the high data rate streams are video, then their quality may be reduced to standard definition resolution, when two or more are multicast on one 802.11 channel. In addition, multicasting the two or more video streams on one 802.11 channel will limit or entirely negate use of the channel for other data access.

Modern 802.11 networks may be implemented in areas where many users and their mobile communication devices are located in a relatively small area. These networks may be arranged with geographically overlapping coverage of different access points on differing channels. So, at most times, one mobile communication device will be within range of two or more access points. The differing channels here might, for example, be the 2.4 GHz Channels 1, 6, and 11. Such a network provides more throughput per unit area, assuming that there is client load balancing across channels. In this arrangement, any given mobile communication device can normally rely on access to two or more 802.11 channels at any given location within the network.

FIG. 1 illustrates coverage in a known wireless communication system 100. The wireless communications system 100 may, for example, be an LTE or 802.11 network. There is overlapping coverage within wireless communications system 100. The three channels STA1, STA2, or STA3 are repeated access the network. However, in the illustrated example, no two neighbouring access points transmit the same channel.

Each dashed circle 110, 120 in FIG. 1 illustrates the coverage area of a particular access point. The channel provided within each dashed circle 110, 120 is indicated by the lettering STA1, STA2, or STA3 within the hexagon located at the centre of the circle. Dashed circle 110 is the extent of coverage of a channel STA1 from one access point. Dashed circle 120 is the extent of coverage of a channel STA2 from another access point.

A mobile communication device located within wireless communications system 100 can typically receive two or more of channels STA1, STA2, or STA3 at any one time. Wireless communications system 100 may typically assign a mobile communication device to receive the channel from the access point that provides the strongest signal to the mobile communication device, subject to suitable load sharing between the various access points.

The operator of a network such as that in FIG. 1 may provide users with access to two or more data streams. One or more of the data streams may, for example, be video streams. This situation should be a perfect use case for 802.11 multicast, such that multiple users can watch the same video stream at roughly the same time, without additional bandwidth cost. However, the video content is sourced from an application server in the communications network, and application servers have no knowledge of 802.11 channels. In reality, therefore, the 802.11 channels can become quickly overloaded in such systems, as multiple video streams are requested by mobile communications devices operating on the same 802.11 channel. Once again, the result is that each mobile communication device receives lower quality video stream, and channel capacity for other data access by other users is lowered.

Accordingly, there is a need for an improved multicast wireless communication system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
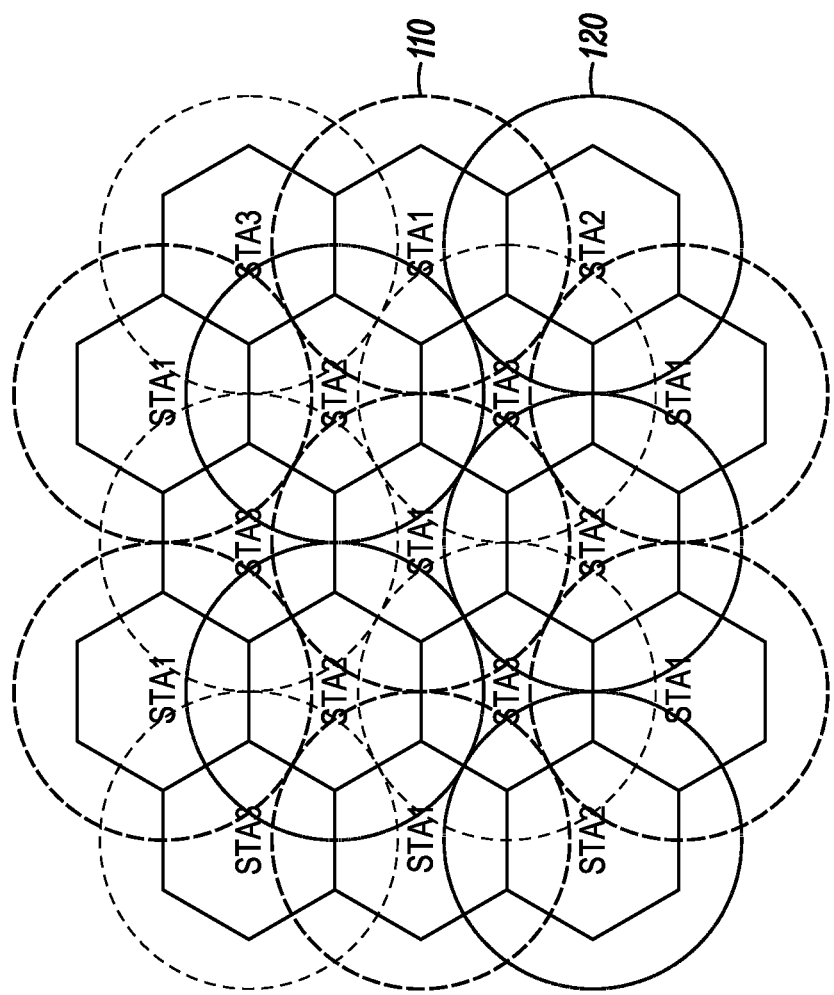
FIG. 1 illustrates coverage in a known wireless radio communication system 100.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method of multicasting data streams in a wireless radio communication system comprises a server assigning a plurality of data streams amongst RF resources. One or more points-of-access of the wireless radio communication system are operable to transmit each RF resource to one or more mobile communication devices. The server receives a request from a mobile communication device of the mobile communication devices, for a selected data stream of the plurality of data streams. The server identifies points-of-access that cannot transmit a selected RF resource, the selected RF resource being an RF resource to which the selected data stream is assigned. The access controller instructs the points-of-access that cannot transmit the selected RF resource to deny association to the mobile communication device. The server multicasts the selected data stream to the mobile communication device through a point-of-access that is operable to transmit the selected RF resource.

The invention may provide multiple high data rate streams to mobile communication devices. The mobile communication devices may, for example, receive subsets of resource blocks in an LTE system, or channels in an 802.11 communication system. However, the underlying communications technology may differ from just LTE or 802.11. In some of the illustrations provided in the remainder of the description, the term channel will be used, but equivalent RF resources in various technologies such as LTE are also to be understood from the term channel.

Reception quality for users, such as received video quality, may be higher than with known systems. The amount of bandwidth that remains available for other services on the same RF resources may also be increased. In some embodiments, each RF resource may just carry one multicast data stream. This is a different outcome than with known systems, in which each RF resource repeats many or all available multicast video streams, with correspondingly lower reception quality for users, and reduced bandwidth for any other services.

One illustrative application scenario is a sports stadium, such as a US National Football League (NFL) stadium or a car racing circuit. An NFL stadium might, for example, provide three multicast High Definition (HD) video feeds over a wireless communication network. The video feeds would be for in-stadium fans to watch. The three video feeds might comprise: the broadcast video feed of the current game; video from Point of View (PoV) cameras mounted players' helmets; and a broadcast video feed of another game that is being played at another stadium.

In this stadium example, a dense array of access points using an N=3 frequency reuse pattern could be provided. Such an array of access points would be similar to the array shown in FIG. 1. However, the reuse pattern would be arranged to ensure that any given mobile communication device within the network has visibility to at least three access points (and thus, channels) simultaneously. The three available video streams would then each be multicast on a unique channel. This may reduce the bandwidth constraints associated with known systems, because known systems would be trying to multicast multiple video streams on a single channel in this stadium scenario.

However, it is not sufficient just to ensure that each of the three available video streams is multicast on a unique channel, i.e. that each channel only carries one of the three video streams. With mobile communication devices functioning as in known systems, there would be no way to ensure that the access point and channel to which the mobile communication device is currently associated is the access point and channel carrying the multicast video stream desired by the user of the mobile communication device.

Thus, with embodiments of the invention, each mobile communication device is forced to associate with the correct channel, i.e. the channel that is carrying the multicast video stream desired by the user of the mobile communication device. By forcibly associating video streams with channels, and forcibly moving users' mobile communication devices to the appropriate channel dependent on their video stream selection, improved utilization of limited channel resources can be achieved. The end result may be higher quality video streams and/or more channel capacity for other users, than with known systems.

The illustrative example above is not limiting. Rather than a stadium, multiple high data rate feeds may be provided, for example, at a concert venue, arts or music festival, conference, or gaming convention. In addition to or instead of video, the high data rate feed may comprise high quality music, telemetry, or other types of streaming data. In addition, some embodiments of the invention provide more than one high data rate feed on one channel. Some embodiments may allow more than one channel to be multicast from the same access point of the network.

Figure 2:
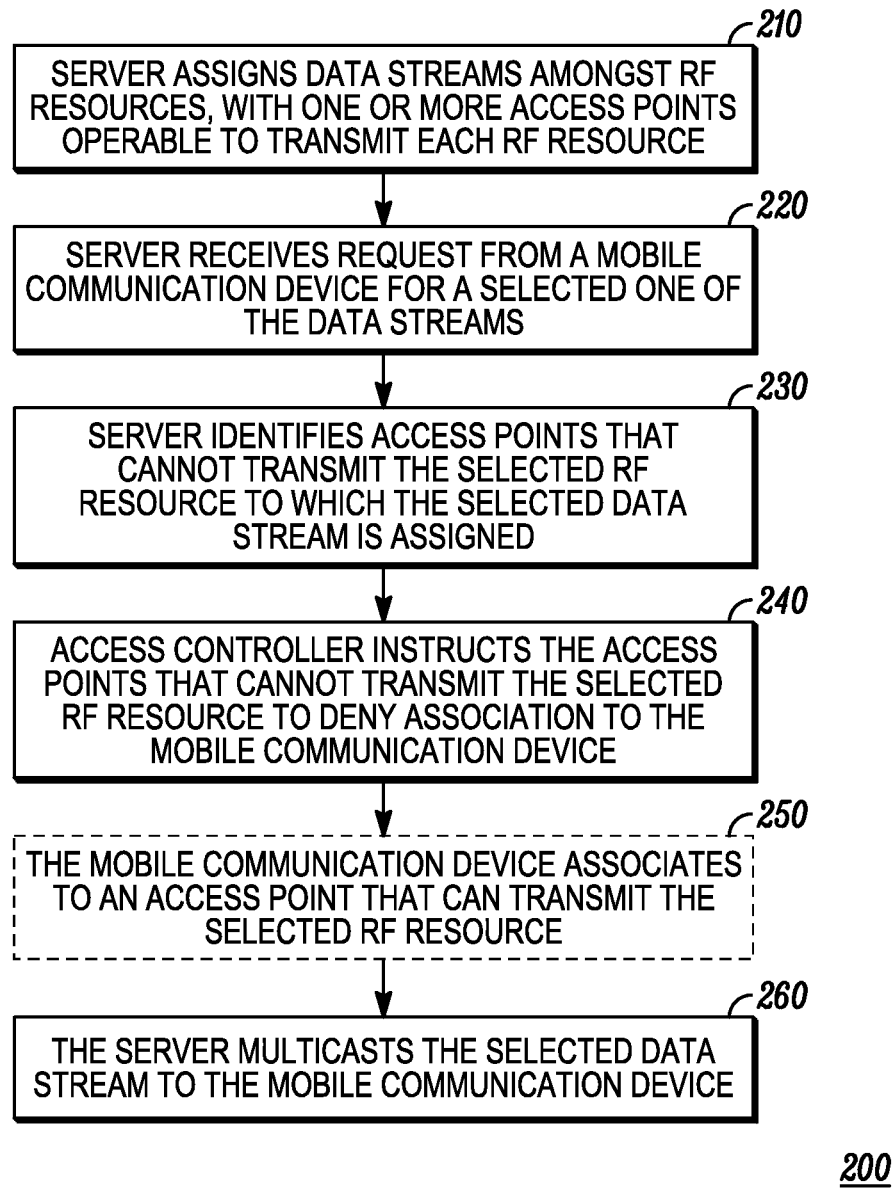
FIG. 2 illustrates a method of multicasting data streams in a wireless radio communication system in accordance with some embodiments.

FIG. 2 illustrates a method 200 of multicasting data streams in a wireless radio communication system. A server assigns a plurality of data streams amongst RF resources. See reference 210. One possible arrangement is for each data stream to be assigned to just one RF resource. Each RF resource may be an LTE channel or an 802.11 channel, for example.

At least one point of access of the wireless radio communication system, and possibly many points of access, is/are operable to transmit each RF resource. Thus each RF resource may be transmitted to one or more mobile communication devices by one or more points of access of the wireless radio communication system. In a stadium or other venue with a geographical re-use pattern similar to that shown in FIG. 1, each RF resource would be transmitted by many points-of access.

In an exemplary embodiment there may be three RF resources, such as the three channels STA1, STA2 and STA3 transmitted from the various locations shown in FIG. 1. In such a case, the three channels STA1, STA2 and STA3 will each be transmitted by many points of access. A first data stream may be assigned to the first channel, a second data stream may be assigned to the second channel and a third data stream may be assigned to the third channel. In this case, any mobile communication device that can receive all three channels is able to receive the first, second or third data streams.

The server receives a request from one of the mobile communication devices for a selected one of the data streams. See reference 220. For example, this might be a mobile communication device requesting the first data stream. The RF resource to which the requested data stream is assigned is henceforth considered to be the 'selected' RF resource.

In an embodiment where a data stream may be transmitted on more than one resource, and the requested data stream is being transmitted on for example two RF resources, then both of these RF resources are 'selected' RF resources. This embodiment is not treated further in FIG. 2 or the discussion of FIG. 2. However, see Table 4 for further details of such an embodiment.

Returning to FIG. 2, the server identifies the points of access that cannot transmit the selected RF resource. See reference 230. In the above example where the first mobile communication device is requesting the first data stream and that data stream is assigned to the first channel, the identified points of access would be all the points of access that have not been assigned the first channel. If each access point can only transmit a single RF resource (channel), then in the example above the points of access identified would be all the points of access that have been assigned either the second or the third channels, i.e. the channels transmitting the second or the third data streams.

The access controller instructs the points of access that cannot transmit the selected RF resource to deny association to the mobile communication device. See reference 240. This effectively restricts the requesting mobile communication device to being able to associate with only points of access that can transmit the selected RF resource. In the above example, the requesting mobile communication device would be permitted only to associate with the points of access that are transmitting the first channel. This forceable restriction of the requesting mobile communication device only to associate with the points of access that are transmitting the first channel is not provided in known systems such as that illustrated in FIG. 1.

At the time of transmitting the request for the selected data stream, the mobile communication device may not already have been associated with one of the points of access that can transmit the RF resource. When this is the case, the mobile communication device will next associate to one of the points of access that can transmit the selected RF resource. See reference 250. In the above example, the requesting mobile communication device will re-associate to one of the points of access that is transmitting the first channel, if it had initially been associated to one of the points of access transmitting only the second or third channels.

When, at the time of transmitting the request for the selected data stream, the mobile communication device was already associated to one of the points of access that could transmit the selected RF resource, the association shown at 250 will not be necessary. For this reason, box 250 in FIG. 2 is only shown in dashed lines. So, in the above example, the requesting mobile communication device simply remains associated to one of the points of access that is transmitting the first channel, if it had initially been associated to one of these points of access.

In some situations, a mobile communication device that needs to re-associate to a new point of access in order to receive the selected RF resource may be able to receive sufficient signal strength from several different points of access that have all been assigned the selected RF resource. The mobile communication device may then associate to the access point that is configured to not disallow the association and that provides the signal of highest quality or strength. In an exemplary situation where a mobile communication device can "see" two base stations that can both provide the requested stream, i.e. would both allow association, then the mobile communication device will choose the base station with the highest signal strength.

The server then multicasts the requested data stream to the mobile communication device. See reference 260. The server will multicast the requested data stream through the access point to which the mobile communication device has newly associated, when this occurs in step 250. Otherwise the server will multicast the requested data stream through the access point to which the mobile communication device was originally associated, i.e. before the start of method 200.

Figure 3:
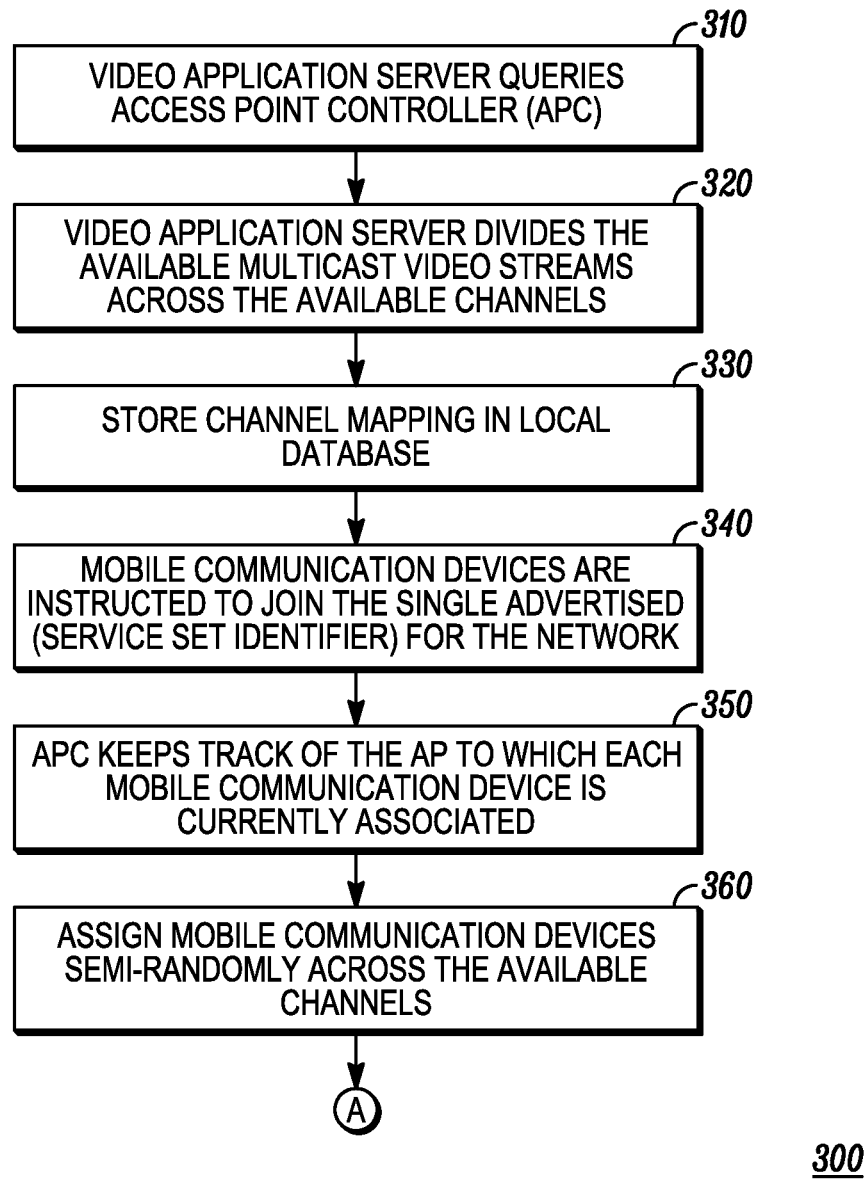
FIG. 3 is a flowchart of a method of initiating operation in a wireless radio communication system in accordance with some embodiments.

FIG. 3 is a flowchart of a method of initiating operation in a wireless communications system, i.e. setting up the system, in accordance with some embodiments. The set-up method illustrated in FIG. 3 provides one example of a detailed method for assigning data streams amongst RF resources, as specified in box 210 of FIG. 2

The method 300 of FIG. 3 sets up a wireless communications system such that mobile communication devices operating in the system can be moved to an appropriate channel, dependent on the high data rate feed that they wish to receive. The mobile communication devices may be LTE or 802.11 devices, and/or may work with other communications systems. The high data rate feed may, for example, be a video stream. The example of a video stream and channels of an 802.11 mobile communication device will be considered henceforth with regard to FIG. 3.

Typically with an enterprise network, all of the Access Points (APs) of the radio communications system share the same Service Set Identifier (SSID), which serves as an identifier of a base station. APs are assigned channels and physically dispersed to minimize interference with one another. A constraint here is that any given mobile communication device should be capable of associating with any of the N channels provided by the radio communications system, from any location.

At start-up, a video application server queries an access point controller (APC), to ascertain design details of the radio communications system. See reference 310. In particular, the video application server ascertains the minimum number of channels to which any given mobile communication device should have visibility. The radio communications system may comprise a video application server, a network comprising access points, and a local database.

The video application server then divides the available multicast video streams across the available channels, assigning each video stream to a channel. See reference 320. If there are more video streams than unique channels, at least one channel may carry two or even more video streams.

When multiple video streams are multiplexed to the same channel, pairing may be done in consideration of which video streams a user may want to watch simultaneously. Moreover, if one video stream is considered to be predominantly popular, it may be available on more than one channel, for example on all channels. One or more of the channels that carry the predominantly popular video stream may then also carry one or more auxiliary streams, such as a stream that is likely to be watched simultaneously by users who want to view the predominantly popular video stream. Returning to the illustrative example of the NFL stadium, the predominantly popular video stream may be the broadcast of the football game that is occurring in that stadium. The auxiliary streams might then comprise one or more of a video broadcast from another football game, or a video from a helmet cam.

The channel mapping is then stored in the local database. See reference 330. The local database may be updated, in order to maintain its contents, see also reference 350 below.

Mobile communication devices within the network, and thereby effectively the users of those devices, are instructed to join the single advertised SSID for the network. See reference 340. These may be mobile communication devices in a particular stadium where the network is located. Alternatively, the network may, for example, be located at a conference venue, a music venue or festival.

As mobile communication devices join the network, the APC keeps track of the AP to which a mobile communication device is currently associated. See reference 350. The APC also keeps track of the Internet Protocol (IP) address of the associated mobile communication device.

Initially, users will be semi-randomly distributed across the available channels. See reference 360. The actual assignment pattern depends on the proximity of each mobile communication device to any given AP, and the behavior of the mobile communication devices. Here the "behavior" may be the result of the network selection algorithm programmed into the device by the manufacturer. Typically, this algorithm is "scan all available channels, try to join them in order of signal strength". Known enterprise networks may carry out actions that are analogous to the instruction, tracking and assignment illustrated by references 340, 350 and 360, but for the strict purpose of load balancing. However, with known enterprise networks, this will not be done from the starting point of reference 320, i.e. with the division of multicast video streams provided by the method 300.

Method 300 of FIG. 3 ends at point A. At point A, the radio communications system is ready to respond to requests from multiple users of mobile communication devices within the network.

Figure 4:
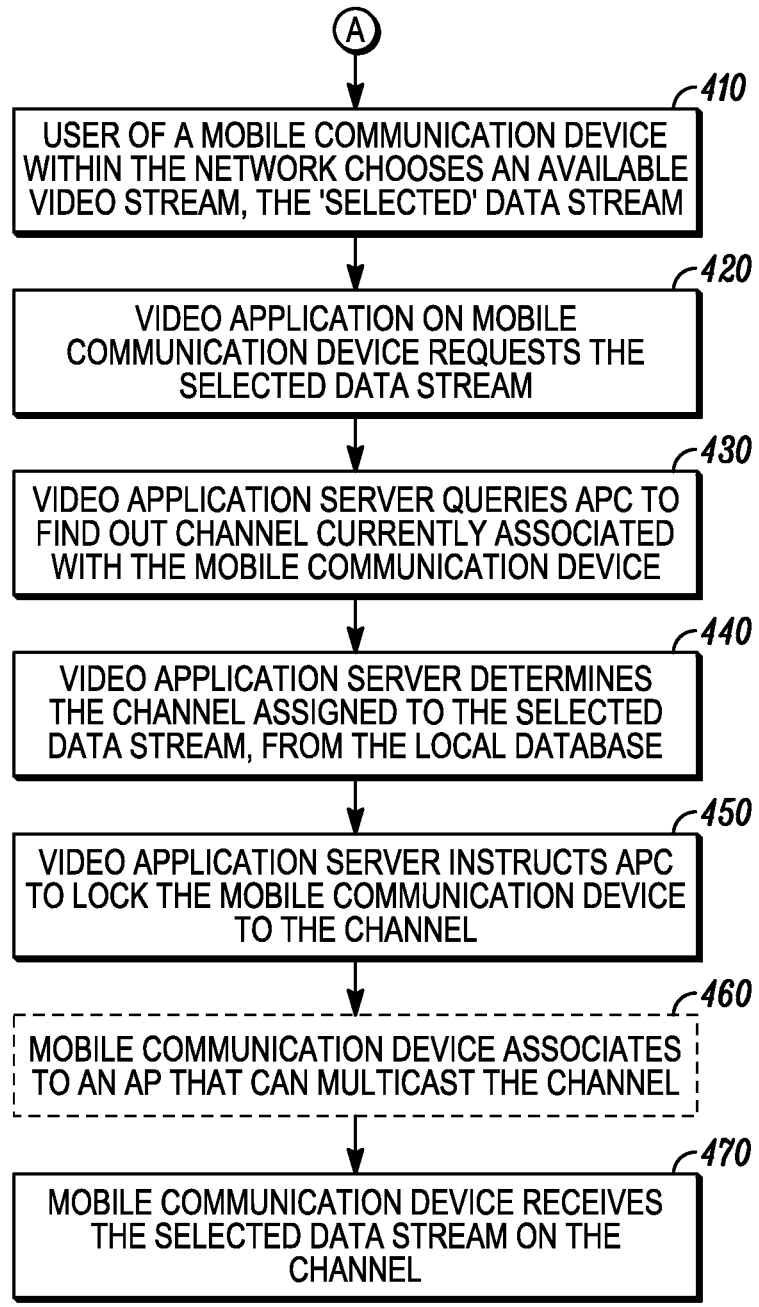
FIG. 4 is a flowchart of further stages of the method of FIG. 3.

FIG. 4 is a flowchart of further stages of the method of initiating a radio communications system of FIG. 3, in accordance with some embodiments. The method 400 of FIG. 4 starts at point A, which was the end point of method 300 of FIG. 3. The method illustrated in FIG. 4 provides one example of a detailed method for implementing the actions specified in boxes 220-260 of FIG. 2.

At some point in time, the user of a mobile communication device within the network chooses an available video stream, as the 'selected' data stream. See reference 410. The user may make this selection via a video application running on the mobile communication device.

The user then requests the selected video stream from the video application server, for example using the video application on the mobile communication device. See reference 420. The video application may use any call control protocol, such as the known call control protocols HLS, WebRTC, MPEG-DASH, RTSP or SIP, to make the request. Assuming RTSP, for example, a RTSP DESCRIBE message is directed to the video application server.

Upon receipt of this initial call setup message, the video application server queries the APC, providing the IP address of the mobile communication device, to ascertain the channel/AP to which the mobile communication device is currently associated. See reference 430. Internally, the APC may need to map the specified client address of the mobile communication device to the client MAC address, to the AP MAC address and in turn to the AP channel.

The video application server then determines the channel (the 'selected RF resource') to which the video stream has been assigned (the 'selected data stream' requested by the mobile communication device). See reference 440. The video application server may obtain this information from its local database.

The video application server then instructs the APC to "lock" or constrain the specified mobile communication device to the appropriate channel for the requested multicast video stream. See reference 450. One approach to constraining the mobile communication device to a specified channel is for the APC to instruct all APs that are not assigned to the specified channel to DENY associations from the mobile communication device. When all other APs refuse to allow the mobile communication device to associate with them, the only option left to the mobile communication device is to associate with one of the APs that is multicasting the correct channel, i.e. the channel which carries the video stream that the mobile communication device has selected.

There are two possibilities to consider. Firstly, the mobile communication device may currently be associated to an AP that can multicast the channel with the selected video stream. The second possibility is that the AP to which the mobile communication device is currently associated cannot multicast the channel with the selected video stream. The first possibility is the simpler. When the mobile communication device is currently associated to an AP that can multicast the channel with the selected video stream, then the mobile communication device can receive the selected video stream immediately. The AP will begin forwarding the multicast video stream, if it wasn't already doing so for another mobile communication device attached to the same AP. However, the AP may already have been forwarding the multicast video stream to another mobile communication device, in which case the mobile communication device simply joins that ongoing multicast transmission.

However, the method of the invention also addresses the second possibility, i.e. when the mobile communication device is currently associated to an AP which cannot multicast the channel with the selected video stream. In this case, the AP to which the mobile communication device is currently associated receives a 'DENY' directive from APC for the request. Then the AP sends a 'DISASSOCIATE' message to the mobile communication device. This 'DISASSOCIATE' message will, in turn, trigger the mobile communication device to re-scan the available channels for the stadium's SSID. The mobile communication device will then reattempt association to another AP. See reference 460. The mobile communication device will repeat this behaviour, until it attempts association with an AP that is assigned to the correct channel for the requested multicast stream.

The mobile communication device's attempts to re-associate can be enhanced by employing additional techniques, to coax the mobile communication device to the correct channel. US 20090323531 A1 is one example of a technique which can be applied. US 20090323531 A1 provides a system for load balancing. In US 20090323531 A1, an access point may stop responding to probe requests from a mobile station on a first band, when the mobile station is submitting probe requests. This simulates to the mobile a situation in which a service set identifier (SSID) associated with a second band is the only one being offered by the access point. This encourages the mobile to connect to the access point using the second band. If the system has large numbers of mobiles already using the first band, but few using the second band, then the approach in US 20090323531 A1 may improve service to both the requesting mobile and the mobiles using the first band, relative to systems in which the requesting mobile would simply be connected to the first band.

During the time when the mobile communication device is still on the wrong channel, the video application server may either ignore the mobile communication's call setup requests, or it may respond with a 'trying?' response. In either case, the video application on the mobile communication device will continue to retry the call setup request, until an error or satisfactory result is received.

Once the mobile communication device has associated to an AP that is multicasting the correct channel, the video application on the mobile communication device will again retry the call setup request. The video application server will verify that the mobile communication device is now on the correct channel. Assuming the mobile communication device is on the correct channel, the video application server will continue forward with the call setup request. The video application server will return the appropriate media addressing communicated, for example, in the Session Description Protocol (SDP) to the mobile communication device indicating the addressing information for the requested multicast video stream. The mobile communication device will then, analogously to standard multicast behavior, join the multicast stream. This may be via an IGMP JOIN message. Once again, the act by the mobile communication device of joining the multicast stream in turn causes the AP to begin forwarding the multicast video stream, if it wasn't already doing so for another mobile communication device attached to the same AP. However, the AP may already have been forwarding the multicast video stream, in which case the mobile communication device simply joins that ongoing multicast transmission.

When the mobile communication device is successfully associated with an AP that can provide the channel with the selected video stream, therefore, the mobile communication device receives the video stream that it selected. See reference 470.

If the user moves location while receiving a multicast video stream, the user's mobile communication device will typically try first to handoff and associate to another AP providing the same channel. Since multicast data streams are assigned to all APs on a specific channel, the handoff should be nearly seamless. Considered in more detail, a given datastream is provided on a given channel. Hence all APs that provide that given channel can provide the given datastream. So the handoff between different APs should provide almost seamless handoff of the datastream. However, it is possible that the mobile communication device wants to handoff to an AP that isn't yet multicasting the datastream, because no other mobile communication device has previously requested the datastream from that AP. In this case, there will be a slight delay, as the AP sets up the datastream. The setup happens automatically. Typically, this occurs when the mobile communication device automatically re-sends IGMP JOIN on handoff.

In the event that the mobile communication device tries to select an AP not on the same channel during handoff, the device will be denied association, because APs not on the correct channel have been programmed to deny association to the specified mobile communication device. The mobile communication device will only be permitted association when the device finds another AP that provides the correct 'selected' channel.

As previously noted, the teachings of US 20090323531 A1 and others can be applied here, to help coax the mobile communication device to the correct channel.

If and when the user ends the video stream, or requests viewing of a video stream not available on the current channel, the mobile communication device is "unlocked" from the current channel. However, when the user requests viewing of a video stream not available on the current channel, the method of the invention may return to and re-start at 220 in the method of FIG. 2. This allows the mobile communication device to receive the video stream that is now desired, from a different AP that can/does provide the video stream desired. During this process, the association illustrated at 250 in FIG. 2 will be necessary.

In order to aid understanding of possible examples of use of the invention, the following tables provide non-limiting numerical examples.

Table 1 shows a first numerical example. Table 1 describes data stream assignments for a communications system with three datastreams, D1, D2 and D3. There are three RF resources, A, B and C. There are ten available points of access, numbered 1-10.

TABLE 1

First numerical example

| Data-stream | The datastream is assigned to the following RF resource: | The following points of access can transmit the datastream and RF resource: |
| --- | --- | --- |
| D1 | A | 1, 4, 7, 10 |
| D2 | B | 2, 5, 8 |
| D3 | C | 3, 6, 9 |

In the first numerical example, the server has assigned each datastream to only one RF resource. Each RF resource is available on multiple points of access. So, for example, a mobile communication device could receive datastream D2 on RF resource B from any of points of access 2, 5 or 8.

Assume that a mobile communication device is initially associated with point of access 1, but requests datastream D2. Assume further that the mobile communication device can only receive a useable signal strength from points of access 1, 2 and 3. The server receives the request for datastream D2. The server identifies that points of access 1,3,4,6,7,9 and 10 cannot transmit RF resource B, to which datastream D2 is assigned. When the access controller instructs all of points of access 1,3,4,6,7,9 and 10 to deny access to the mobile communication device, then the mobile communication device can only set up an association with point of access 2, because it is denied access to the only other two points of access from which it can receive a useable signal strength. The mobile communication device then receives the selected RF resource B, providing data stream D2, from point of access 2.

Considering Table 1 once again, assume now that a second mobile communication device can receive a useable signal strength from all of points of access 5-10, and wants to receive datastream D3. The server receives the request for datastream D3, and identifies that points of access 1,2,4,5, 7,8 and 10 cannot transmit RF resource C, to which datastream D3 is assigned. So the access controller instructs all of points of access 1,2,4,5,7,8 and 10 to deny access to the mobile communication device. If the mobile communication device were associated with any of points of access 5, 7, 8 or 10 at the time of making the request for datastream D3, then it needs to re-associate with either point of access 6 or point of access 9. The mobile communication device may associate, for example, to the access point that provides the highest signal strength, e.g. point of access 6. However, if the mobile communication device were associated with either point of access 6 or point of access 9, at the time of making the request for datastream D3, then it does not need to re-associate.

Table 2 shows a second numerical example. Table 2 describes data stream assignments for another communications system with five datastreams, D1-D5. There are again three channels, A, B and C. There are ten available points of access, numbered 1-10. RF resource A is operable to multicast both datastream D1 and datastream D4. RF resource B is operable to multicast both datastream D2 and datastream D5. RF resource C is operable to multicast only datastream D3.

TABLE 2

Second numerical example

| Data-stream | The datastream is assigned to the following RF resource: | The following points of access can transmit the RF resource in the second column of the table: | The following points of access can transmit the datastream in the left column of the table: |
| --- | --- | --- | --- |
| D1 | A | 1, 4, 7, 10 | 1, 4, 7, 10 |
| D2 | B | 2, 5, 8 | 2, 5, 8 |
| D3 | C | 3, 6, 9 | 3, 6, 9 |
| D4 | A | | 1, 4, 7, 10 |
| D5 | B | | 2, 5, 8 |

In the second numerical example, five datastreams can be multicast using only three RF resources. If the datastreams are video streams, then datastream D4 may, for example, be a video stream that is likely to be of interest to users of mobile communication devices that would also want to receive the video stream D1. Datastream D5 may, for example, be a video stream that is likely to be of interest to users of mobile communication devices that would also want to receive the video stream D2.

Table 3 shows a third numerical example. Table 3 describes data stream assignments for a communications system with three datastreams, D1, D2 and D3. There are five RF resources, A-E. There are ten available points of access, numbered 1-10. Datastream D1 is an important datastream, so is multicast on all RF resources A-E. However, RF resource D can provide both datastream D1 and datastream D2. RF resource E can provide both datastream D1 and datastream D3.

The third and fourth columns of table 3 is based on an example where: RF resource A is transmitted from access points 1 and 2; RF resource B is transmitted from access points 3 and 4; RF resource C is transmitted from access points 5 and 6; RF resource D is transmitted from access points 7 and 8; and RF resource E is transmitted from access points 9 and 10.

TABLE 3

Third numerical example

| Data-stream | The datastream is assigned to the following RF resource: | The following points of access can transmit the RF resource in the second column of the table: | The following points of access can transmit the datastream in the left column of the table: |
| --- | --- | --- | --- |
| D1 | A | 1 and 2 | 1-10 |
| D1 | B | 3 and 4 | |
| D1 | C | 5 and 6 | |
| D1 | D | 7 and 8 | |
| D1 | E | 9 and 10 | |
| D2 | D | 7 and 8 | 7 and 8 |
| D3 | E | 9 and 10 | 9 and 10 |

Table 4 shows a fourth numerical example. Table 4 describes data stream assignments for a communications system with three datastreams, D1, D2 and D3. There are three RF resources, A, B and C. There are ten available points of access, numbered 1-10. In the fourth numerical example, some points of access can transmit more than one RF resource.

TABLE 4

Fourth numerical example

| Data-stream | The datastream is assigned to the following RF resource: | The following points of access can transmit the datastream and RF resource: |
| --- | --- | --- |
| D1 | A | 1, 4, 7, 10 |
| D2 | B | 1, 2, 5, 8 |
| D3 | C | 1, 2, 3, 6, 9 |

In the fourth numerical example, the server has assigned each datastream to only one RF resource. Each RF resource is available on multiple points of access. This was also the case with the first numerical example, see the first two columns of Table 1. However, viewing all the rows of the third column of Table 4 together, it is clear that the third column table 4 differs from the third column in Table 1. Point of access number 1 can transmit all of RF resources A, B and C. Point of access number 2 can transmit both RF resource B and RF resource C.

The method of the present application may not require changes to existing mobile communication devices. Likewise, the method may be implemented in existing dense user populations, i.e. without requiring additional base stations or access points in the networks. The changes required to implement the method may be made as a new resource management technique in such radio communication systems. Existing APs and APCs may be used if they provide appropriate management interfaces to DENY certain devices access to certain channels.

Where the application refers to a point of access transmitting more than one RF resource, such as in table 4, then the resources may be two or more different LTE channels or subsets of resource blocks, transmitted from one LTE base station. Alternatively, the RF resources may be one 802.11 channel in the 2.4 GHz band, and a second channel in the 5 GHz band, transmitted from one 802.11 AP.

Figure 5:
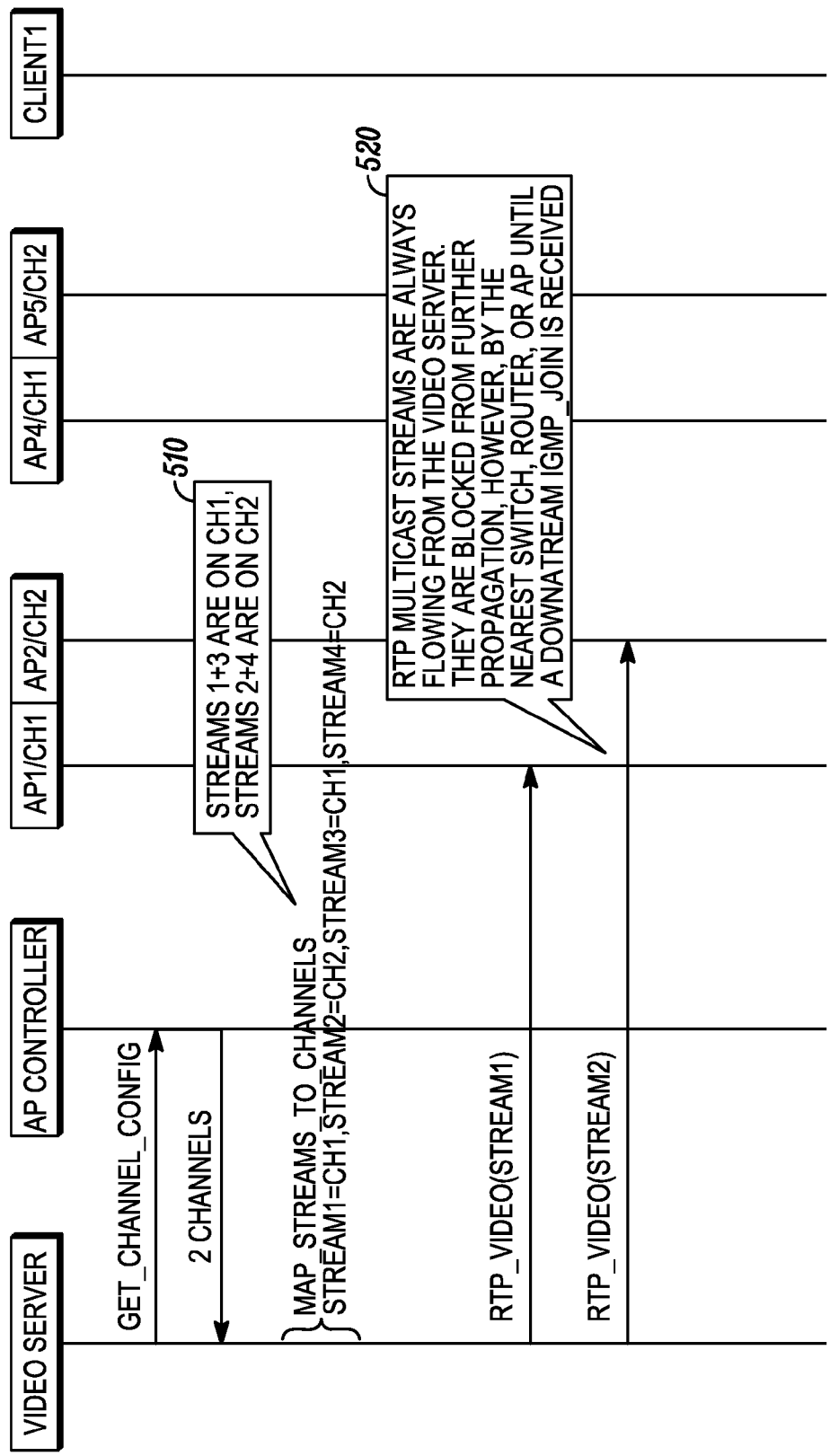
FIG. 5 is a schematic of messages and data streams that may be exchanged in accordance with some embodiments at initialization.

FIG. 5 is a schematic of messages and data streams that may be exchanged in accordance with some embodiments at initialization. The messages and data streams illustrated in FIG. 5 represent one way to achieve the actions of blocks 310 and 320 of FIG. 3.

As specified at 310, the video application server obtains information about the channel configuration. At startup, the video application server may query the APC to ascertain the minimum number of channels to which any given mobile communication device should have visibility. The illustrative example of FIG. 5 may be a stadium with only two channels available. As shown at 510 in FIG. 5, the video application server then divides the available multicast video streams across the two available channels, assigning each video stream to a channel. The video application server may store that mapping in a local database, see again box 330 in FIG. 3. As there are more video streams than unique channels, channels may carry two or more video streams. In the illustrative example of FIG. 5, streams 1 and 3 are on channel CH1 Streams 2 and 4 are on CH2.

As shown at 520 in the illustrative example of FIG. 5, the multicast streams are constantly transmitted by the video application server. The row of boxes along the top edge of FIG. 5 shows that access points AP1 and AP4 receive and can then provide channel CH1. Access points AP2 and AP5 receive and can then provide channel CH2. This provision of channels by each of access points AP1, AP2, AP4 and AP5 is carried over into all of FIGS. 6-9.

The pairing of streams 1 and 3 onto channel 1 may have been decided on the basis that a significant number of users may want to watch streams 1 and 3 simultaneously. Likewise, streams 2 and 4 might be of interest, together, to a significant number of users. When users are invited to join a single advertised SSID, they may initially be semi-randomly distributed across CH1 and CH2.

Figure 6A:
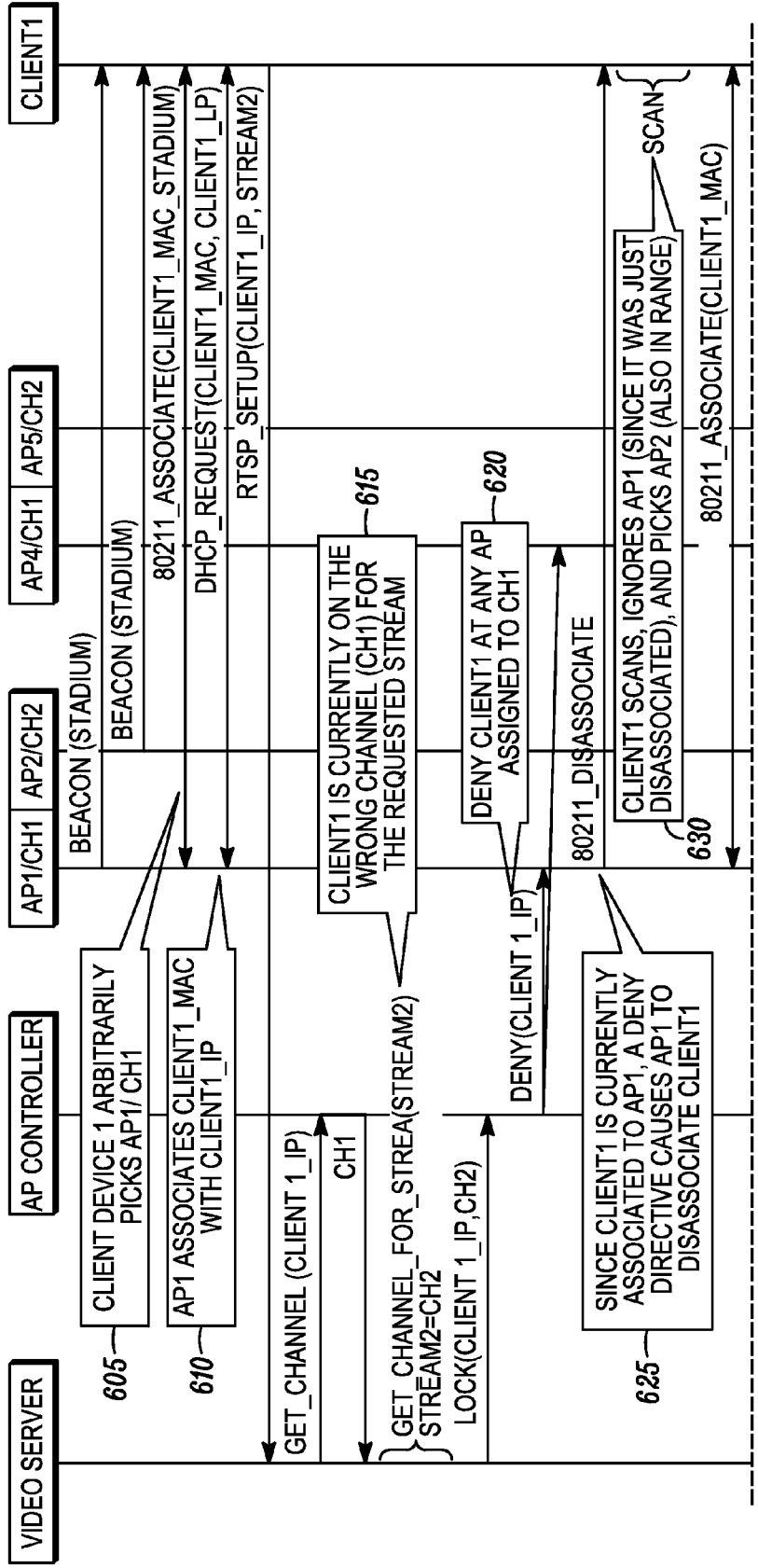
FIGS. 6A and 6B depict a schematic of messages and data streams that may be exchanged in accordance with some embodiments during streaming.
Figure 6B:
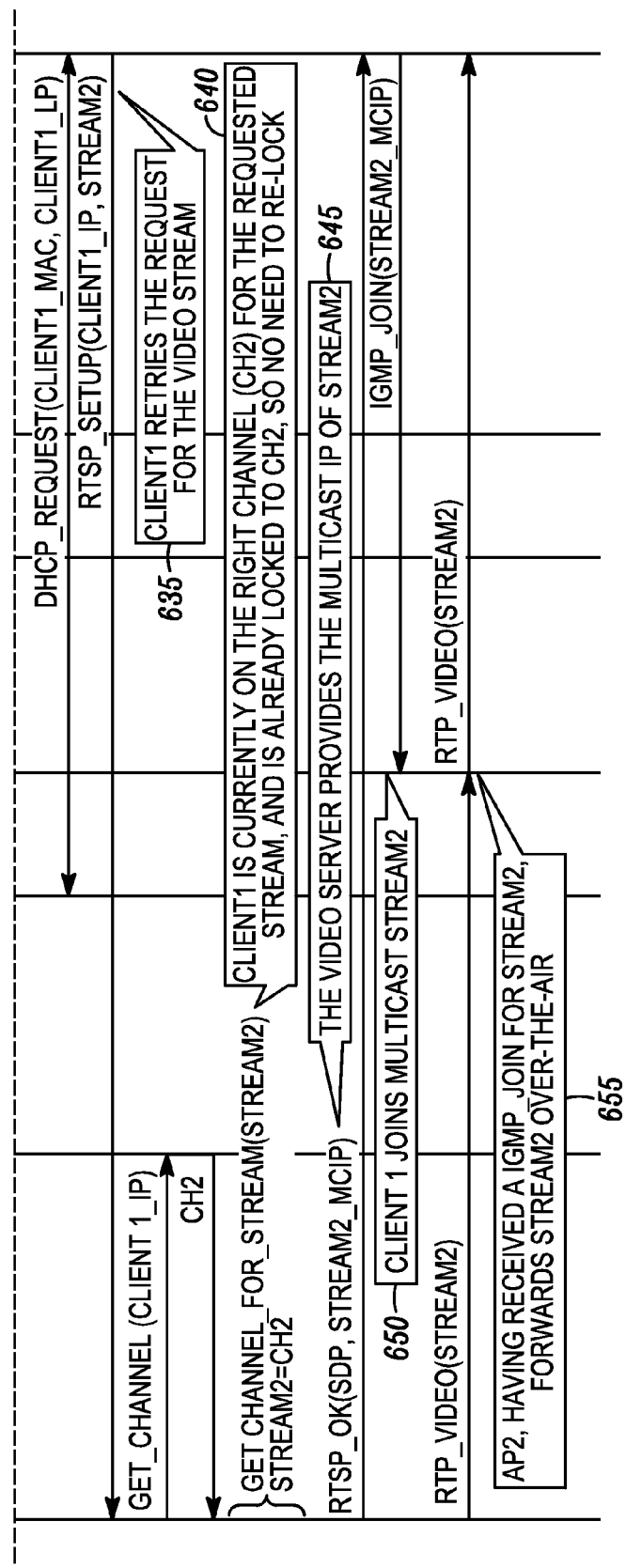

FIGS. 6A and 6B depict a schematic of messages and data streams that may be exchanged in accordance with some embodiments during streaming FIG. 6A precedes FIG. 6B.

Box 605 indicates that a first mobile communication device in the stadium initially chooses to be associated with AP1, which is assigned CH1. Box 610 indicates the association, by AP1, of the client 1 MAC with the Client 1 IP address.

The mobile communication device may display to the user an overview of the various video streams that are being broadcast in the stadium, for example via a video application running on the mobile communication device. At some point in time, a user of a mobile communication device selects a particular available video stream, see again reference 410 in FIG. 4. This selection may be via the video application running on the mobile communication device, see again reference 420 in FIG. 4.

The video application then requests the stream from the video server, for example using any known call control protocol (e.g., RTSP, SIP). Upon receipt of this initial call setup message, the video server queries the APC, providing the IP address of the client device, to ascertain the channel to which the client is currently associated. In the illustrative example of FIG. 6A, the user has in fact requested a video stream that is not available through AP1. The video server then determines the channel assigned to the requested media stream from its local database. Box 615 indicates the finding by the video application server that client 1 is in fact currently on the wrong channel, CH1, for the video stream that the user has requested.

The video server then instructs the APC to 'lock' the specified client device to the appropriate channel for the requested multicast stream. The consequence of this is shown in box 620, where the mobile communication device is denied association at any AP that is providing channel CH1. A 'DENY' directive is sent to all APs that provide channel CH1.

If the mobile communication device is currently associated to an AP/channel which received a 'DENY' directive, then the AP sends a 'DISASSOCIATE' message to the specified client device. This is the case in FIG. 6A, since the mobile communication device is associated with AP1. See box 625.

This will, in turn, trigger the mobile communication device to re-scan the available channels for the stadium's SSID and reattempt association to another AP. See box 630. The client will repeat this behavior until it attempts association with an AP assigned to the correct channel. While the client device is on the wrong channel, the video server may either ignore the client's call setup requests, or it may respond with a 'trying . . . ' response. In either case, the video application on the client device will continue to retry the call setup request until an error or satisfactory result is received. As shown in box 630, the mobile communication device eventually chooses AP2.

Considering now FIG. 6B, once the client device has associated to the correct channel, the video application on the client device will again retry the call setup request. See box 635. The video server will verify that the client device is now on the correct channel. See box 640.

Assuming the client device is on the correct channel, the video server will continue forward with the call setup request. The video server will return the appropriate SDP to the client, indicating the addressing information for the requested multicast stream. See box 645.

Per standard multicast behavior, the client device will join the multicast stream, via an IGMP JOIN message. See box 650. This in turn causes the AP to begin forwarding the multicast stream, if it wasn't already doing so for another client device attached to the same AP. See box 655.

Figure 7:
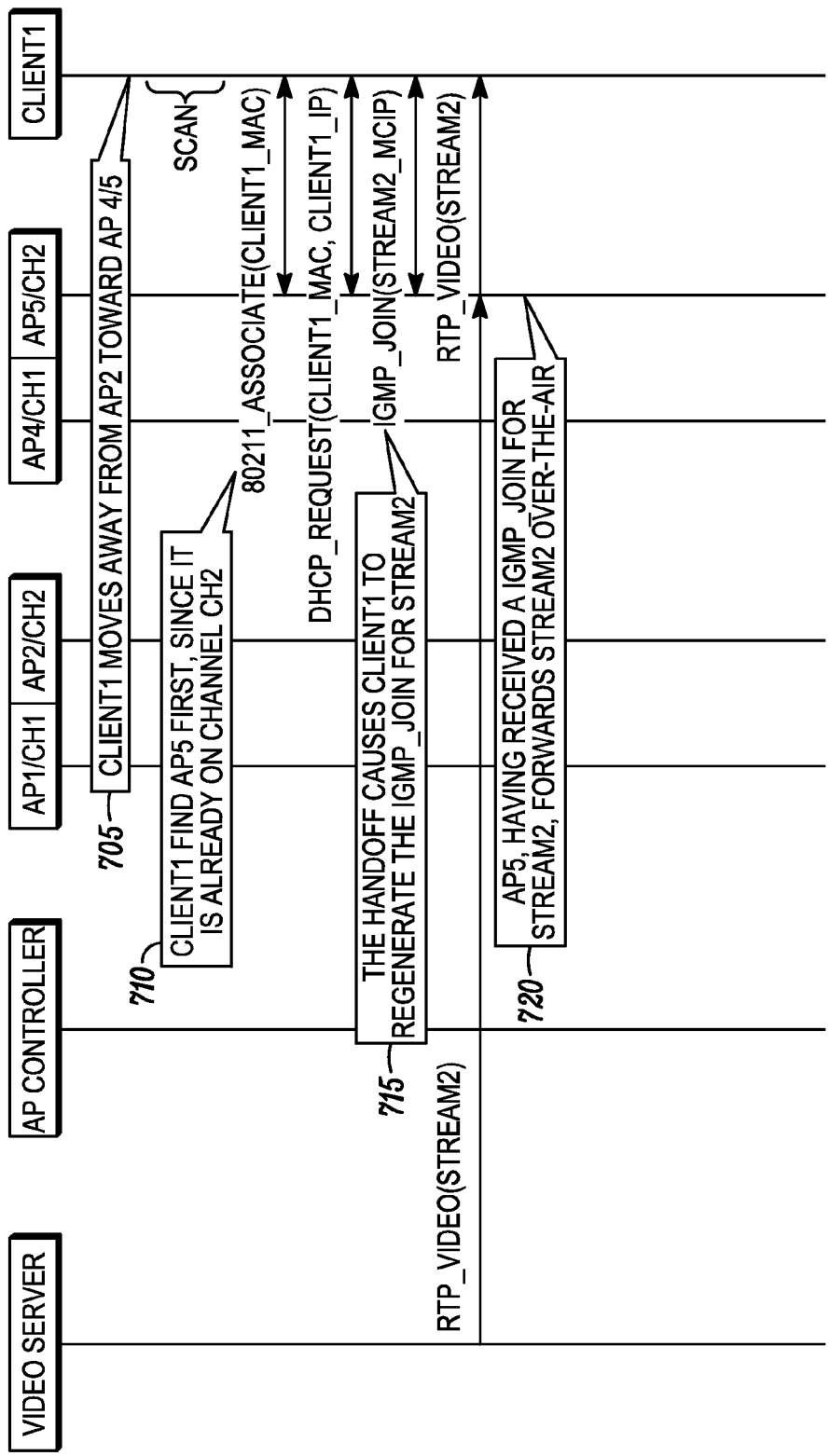
FIG. 7 is a schematic of messages and data streams that may be exchanged in accordance with some embodiments during handoff.

FIG. 7 is a schematic of messages and data streams that may be exchanged in accordance with some embodiments during handoff. In particular, the handoff may be such that the mobile communication device continues to receive the same channel after association with a new access point. Thus FIG. 7 illustrates one example of mobility without changing channel.

If the user moves while receiving a multicast video stream, the user's mobile communication device will typically try first to handoff and associate to another AP on the same channel. In this case, the handoff should be nearly seamless. Box 705 in FIG. 7 shows the client moving away from access point AP1. This may result from a physical movement of the user, who is simply carrying the mobile communication device with him/her to a new location.

At box 710, the mobile communication device finds access point AP5 first. At box 715, the mobile communication device re-generates the IGMP_JOIN for the desired second data stream. At box 720, access point AP5 then supplies the video stream requested by the mobile communication device.

Figure 8:
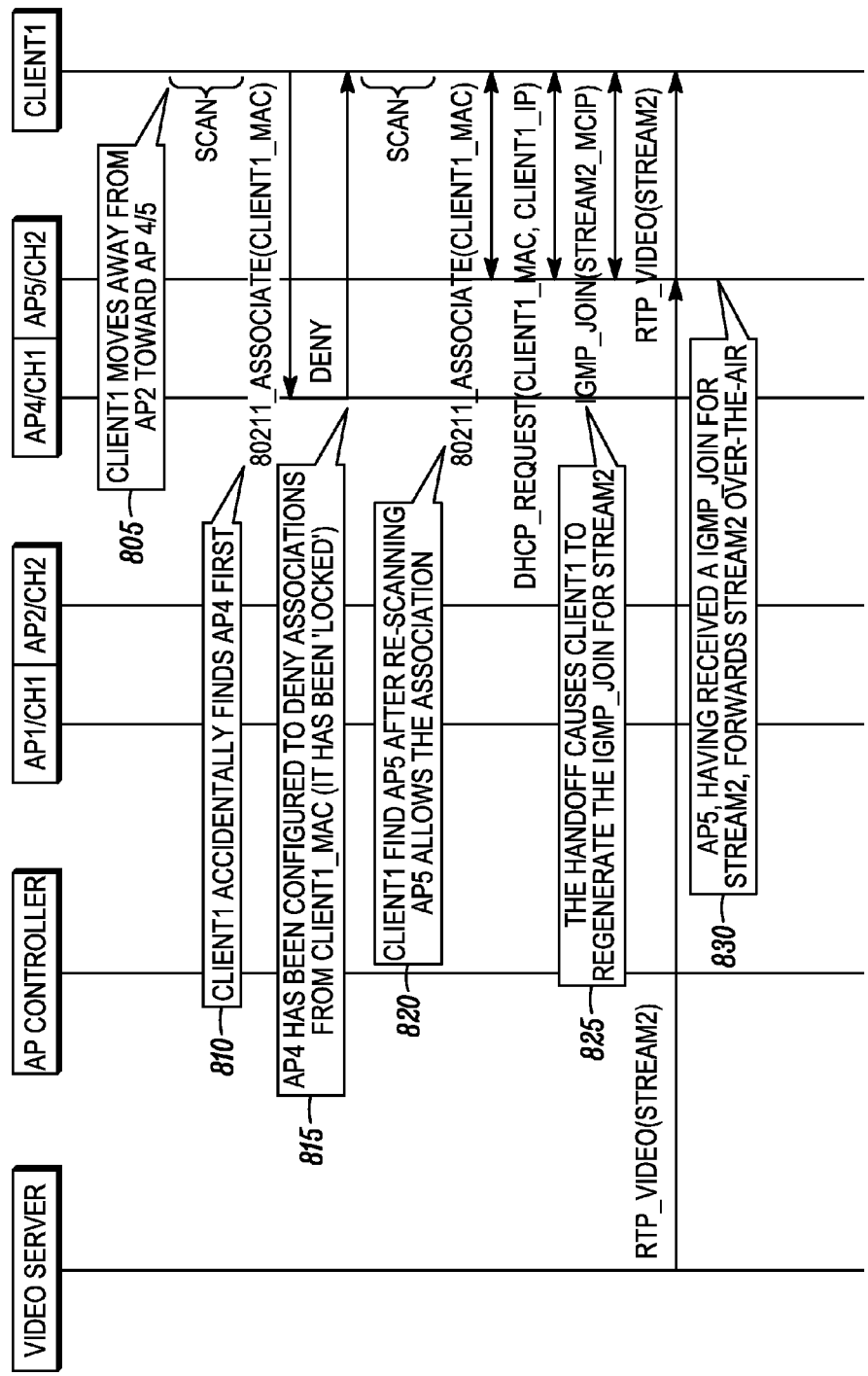
FIG. 8 is a schematic of messages and data streams that may be exchanged in accordance with some embodiments during handoff.

FIG. 8 is a schematic of messages and data streams that may be exchanged in accordance with some embodiments during handoff. In particular, the mobile communication device may attempt to handoff to an access point that cannot provide the same channel as an earlier access point. Thus FIG. 8 should be read and contrasted with FIG. 7. FIG. 8 illustrates an example where, during handoff, the mobile communication device selects an access point that is not on the same channel. In this situation, the device will be denied association, since access points not on the correct channel have been programmed to deny association to the specified client device. The mobile communication device will continue to be denied association until the device finds an access point on the correct channel. The teachings of US-A1-20090323531 could be applied here to help coax the client device to the correct channel.

At box 805, the mobile communication device moves away from access point AP1. This is comparable to box 705 in FIG. 7. However, at box 810, the mobile communication device finds a different access point AP4, i.e. different to the example in box 710 of FIG. 7. The attempt by the mobile communication device to associate with access point AP4 is unsuccessful, since AP4 has been instructed to deny access to the mobile communication device. See box 815.

After further scanning by the mobile communication device, the mobile communication device locates access point AP5. See box 820. The mobile communication device re-generates the IGMP_JOIN for the desired second data stream. See box 825, which is analogous to box 715 in FIG. 7. Access point AP5 then supplies the video stream requested by the mobile communication device. See box 830, which is analogous to box 720 in FIG. 7.

Figure 9:
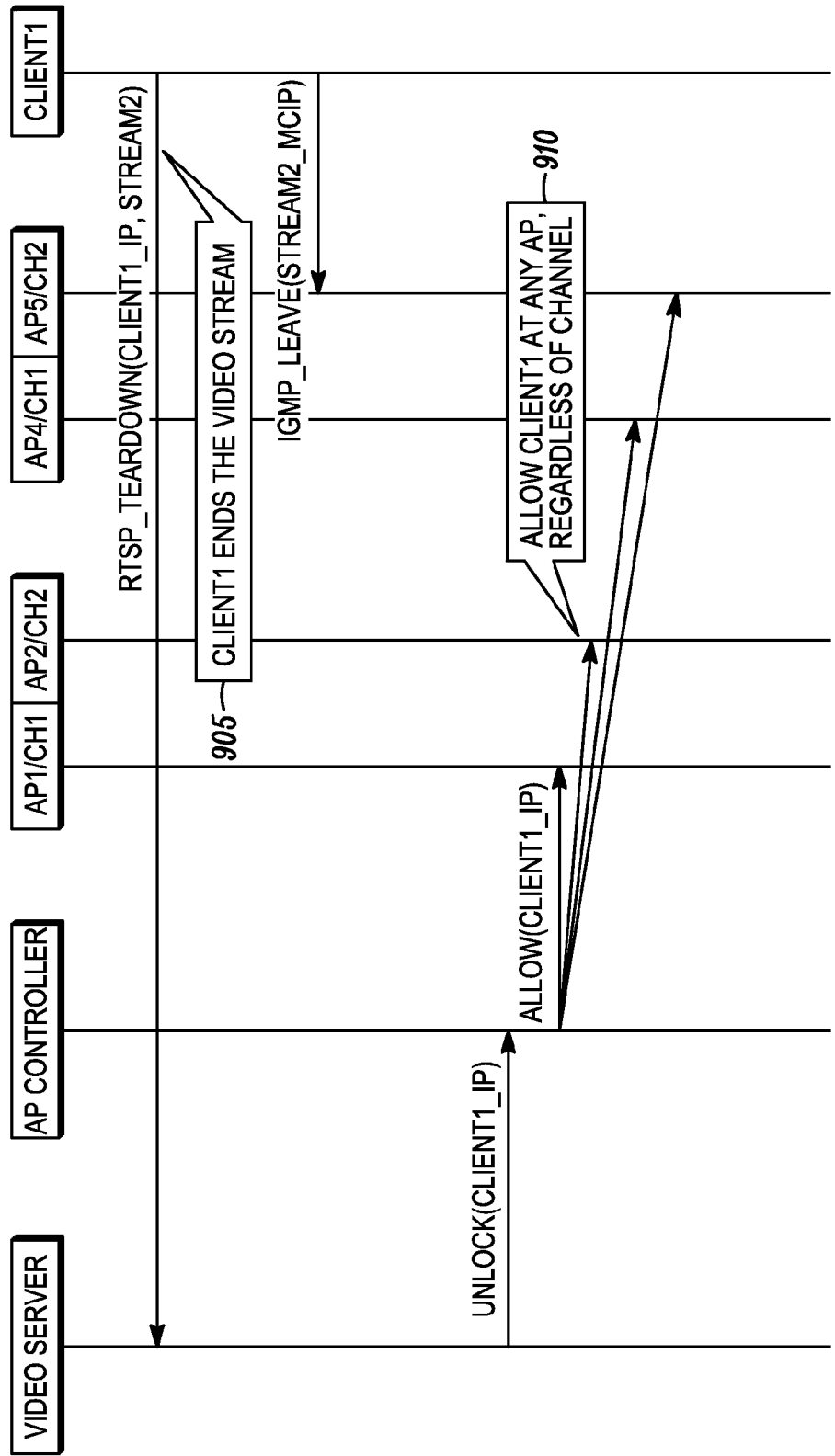
FIG. 9 is a schematic of messages that may be exchanged in accordance with some embodiments when a user ends reception of a video stream.

FIG. 9 is a schematic of messages that may be exchanged in accordance with some embodiments, when a user ends reception of a video stream. If and when the user ends the video stream, the mobile communication device is unlocked from the current channel. Alternatively, the mobile communication device may be unlocked from the current channel when the mobile communication device requests viewing of a stream not available on the current channel.

Box 905 illustrates the example of the user of a mobile communication device deciding to end reception of a video stream. The video application server then unlocks the client IP address. At box 910, the mobile communication device may be allowed to associate with any access point. This situation may continue until the mobile communication device selects a new data stream. At this point, the method of FIG. 2 may begin again at box 220.

Figure 10:
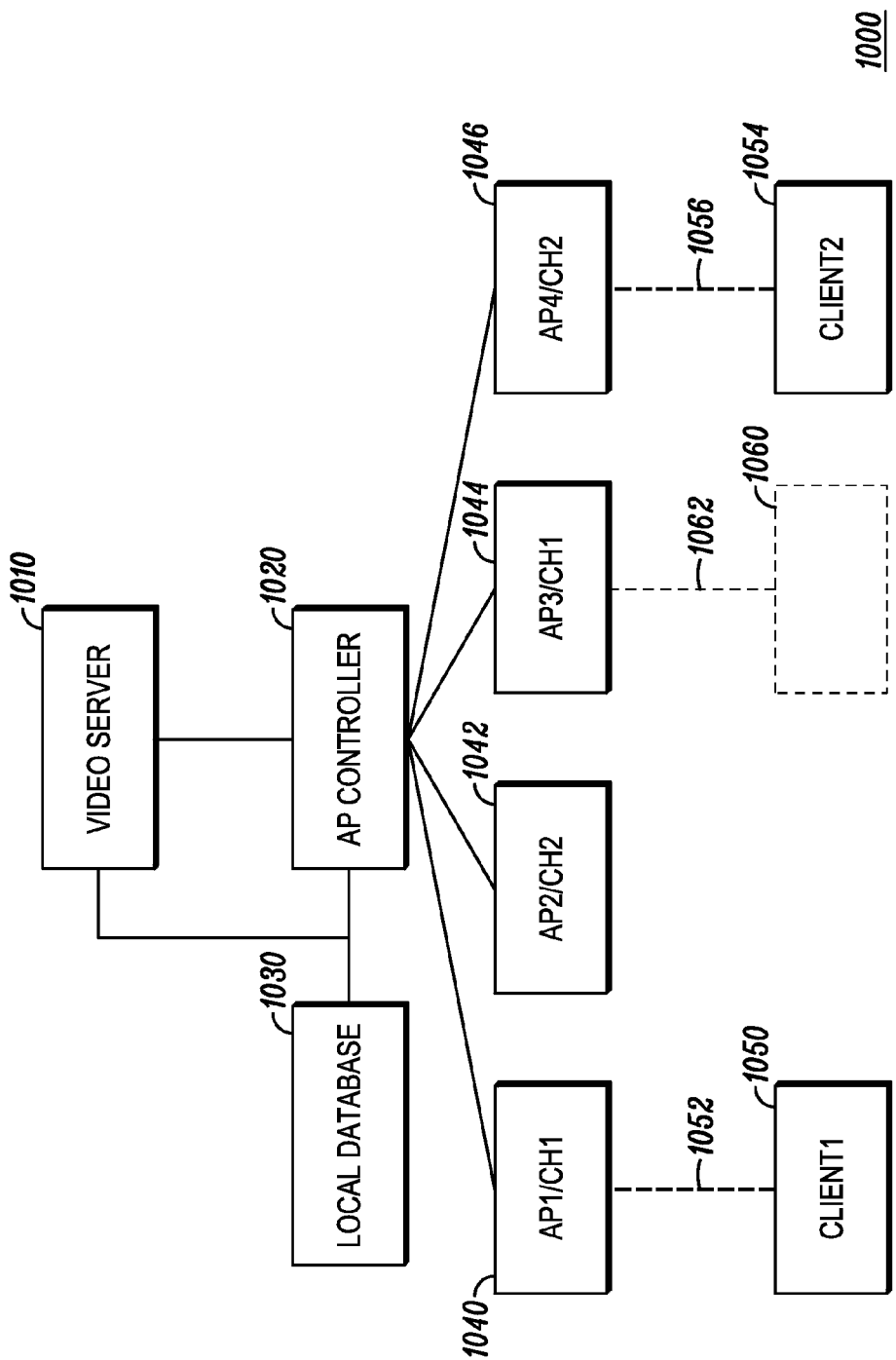
FIG. 10 provides an illustrative schematic view of an embodiment of a wireless radio communication system in accordance with an embodiment.

FIG. 10 provides an illustrative schematic view of an embodiment of a wireless communication system in accordance with an embodiment.

The system 1000 comprises video application server 1010 and access point controller 1020. Local database 1030 is linked to both video application server 1010 and access point controller 1020. Access point controller 1020 is, in turn, liked to each of first access point 1040, second access point 1042, third access point 1044 and fourth access point 1046. The functions of video application server 1010, access point controller 1020 and local database 1030 may, however, be incorporated in a variety of hardware and software elements.

First mobile communication 'CLIENT 1' 1050 is receiving channel 'CH1' from first access point 1040, as indicated by first path 1052. Second mobile communication device 'CLIENT 2' 1054 is receiving channel 'CH2' from fourth access point 1046, as indicated by second path 1056.

Dashed area 1060 indicates a location to which first mobile communication device 'CLIENT 1' 1050 may move, at a later point in time. When first mobile communication device 1050 attempts to associate with a new access point, it will find that second access point 1042 and fourth access point 1046 deny association to it. However, third access point 1044 will not deny association to first mobile communication device 1050. In location 1060, first mobile communication device 1050 will associate with third access point 1044. Third access point 1044 will then supply channel 'CH1' to first mobile communication device 1050 at location 1060, as indicated by third path 1062.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. For example, the servers and access controllers described herein each includes a processor, such as one or more microprocessors, microcontrollers, digital signal processors (DSPs), combinations thereof or such other devices known to those having ordinary skill in the art. Each such processor operates the corresponding server or access controller according to data and instructions stored in a respective at least one memory device of the server or access controller, such as random access memory (RAM), dynamic random access memory (DRAM), and/or read only memory (ROM) or equivalents thereof, that stores data and programs that may be executed by the corresponding processor so that the server or access controller may perform the functions described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of multicasting data streams in a wireless radio communication system, the method comprising:
   a server assigning a plurality of data streams amongst RF resources, one or more points-of access of the wireless radio communication system being configured to transmit each RF resource to one or more mobile communication devices;
   the server receiving a request from a mobile communication device of the mobile communication devices for a selected data stream of the plurality of data streams;
   the server identifying points-of-access that cannot transmit a selected RF resource, the selected RF resource being an RF resource to which the selected data stream is assigned;
   an access controller instructing the points-of-access that cannot transmit the selected RF resource to deny association to the mobile communication device; and
   the server multicasting the selected data stream to the mobile communication device through a point-of-access that is configured to transmit the selected RF resource.

2. The method of claim 1, wherein, following the access controller instructing the points-of-access that cannot transmit the selected RF resource to deny association to the mobile communication device:
   the mobile communication device creates a new association to a selected point of access of the points-of-access that can transmit the selected RF resource; and
   the server multicasts the selected data stream to the mobile communication device through the selected point-of-access.

3. The method of claim 1, wherein:
   when, at the time of transmitting the request for the selected data stream, the mobile communication device is already associated to one of the access points that could transmit the selected data stream on the selected RF resource,
   the server multicasts the selected data stream to the mobile communication device through the point-of-access to which the mobile communication device is associated.

4. The method of claim 1, wherein:
   the server is a video server and the data streams comprise video streams;
   the point-of-access is a base station of an LTE wireless radio communication system; and
   the RF resource is a channel of the LTE wireless radio communication system.

5. The method of claim 1, wherein:
   the server is a video server and the data streams comprise video streams;
   the point-of-access is an access point of an 802.11 wireless radio communication system; and
   the RF resource is a channel of an 802.11 wireless radio communication system.

6. The method of claim 1, wherein, responsive to receiving the request from the mobile communication device for the selected data stream, the server determines:
   a current RF resource, on which the mobile communication device is communicating with the wireless radio communication system at the time of making the request;
   a selected RF resource to which the selected data stream is assigned;
   a set of points-of-access that are not transmitting the selected RF resource for the requested data stream.

7. The method of claim 6, wherein the server assigning the plurality of data streams amongst RF resources further comprises:
   determining a number of unique RF resources available on a wireless network of the wireless radio communication system; and
   mapping data streams to RF resources so as to prevent any one RF resource from carrying significantly more data than a mean data transmission rate for the RF resources.

8. The method of claim 1, wherein the access controller instructing the points-of-access that cannot transmit the selected RF resource to deny association to the mobile communication device further comprises:
   disassociating the mobile communication device from a point-of-access to which the mobile communication device is currently associated; and
   the mobile communication device:
   re-scanning the available RF resources;
   attempting to associate with one or more other points-of-access, until the mobile communication device associates with a point-of-access that is one of the one or more points-of access that can transmit the selected RF resource;

receiving addressing information for the requested data stream from the point-of-access that can transmit the selected RF resource.

9. The method of claim 8, further comprising the server:
determining a first data stream for which demand amongst users of the mobile communication devices is likely to be higher than for other data streams;
determining a second data stream likely to be viewed simultaneously with the first data stream; and
assigning both the first and second data streams to an RF resource, whereby mobile communication devices receiving the RF resource will receive both the first and second data streams.

10. A method of multicasting data streams in a wireless radio communication system, the method comprising:
a server assigning a plurality of data streams amongst RF resources, one or more points-of-access of the wireless radio communication system being configured to transmit each RF resource to one or more mobile communication devices, and at least one of the plurality of data streams being assigned to at least two RF resources;
the server receiving a request from a mobile communication device of the mobile communication devices for a selected data stream of the plurality of data streams;
the server identifying points-of-access that cannot transmit one or more selected RF resources, the one or more selected RF resources being RF resources to which the selected data stream is assigned;
the access controller instructing the points-of-access that cannot transmit the one or more selected RF resources to deny association to the mobile communication device; and
the server multicasting the selected data stream to the mobile communication device through a point-of-access that is configured to transmit at least one of the one or more selected RF resources.

11. The method of claim 10, wherein the server assigning a plurality of data streams amongst RF resources further comprises the server:
determining a first data stream for which demand amongst users of the mobile communication devices is likely to be higher than for other data streams; and
assigning the first data stream to the at least two RF resources.

12. The method of claim 11, further comprising the server:
determining a second data stream likely to be viewed simultaneously with the first data stream; and
assigning both the first and second data streams to one of the at least two RF resources, whereby mobile communication devices receiving the one of the at least two RF resources will receive both the first and second data streams.

13. An apparatus for multicasting data streams in a wireless radio communication system, the wireless radio communication system comprising a plurality of points-of-access, whereby each point-of-access is configured to transmit at least one RF resource to one or more mobile communication devices, the apparatus comprising:
a server, the server configured to:
assign a plurality of data streams amongst RF resources;
receive a request from a mobile communication device of the mobile communication devices for a selected data stream of the plurality of data streams;
identify points-of-access that cannot transmit a selected RF resource, the selected RF resource being an RF resource to which the selected data stream is assigned;
an access controller, the access controller configured to instruct the points-of-access that cannot transmit the selected RF resource to deny association to the mobile communication device; and
the server further configured to multicast the selected data stream to the mobile communication device through a point-of-access that is configured to transmit the selected RF resource.

14. The apparatus of claim 13, wherein:
the server is a video server and the data streams comprise video streams;
the point-of-access is a base station of an LTE wireless radio communication system; and
the RF resource is a channel of the LTE wireless radio communication system.

15. The apparatus of claim 13, wherein:
the server is a video server and the data streams comprise video streams;
the point-of-access is an access point of an 802.11 wireless radio communication system; and
the RF resource is a channel of an 802.11 wireless radio communication system.

16. The apparatus of claim 13, wherein the server is further configured, responsive to receiving the request from the mobile communication device for the selected data stream, to determine:
a current RF resource, on which the mobile communication device is communicating with the wireless radio communication system at the time of making the request;
an RF resource to which the selected data stream is assigned;
a set of points-of-access that are not transmitting the selected RF resource for the selected data stream.

17. The apparatus of claim 13, wherein the server, in order to assign the plurality of data streams amongst RF resources, is further configured to:
determine a number of unique RF resources available on a wireless network of the wireless radio communication system; and
map data streams to RF resources, so as to prevent any one RF resource from carrying significantly more data than a mean data transmission rate for the RF resources.

18. The apparatus of claim 13, wherein, in order to instruct the points-of-access that cannot transmit the selected RF resource to deny association to the mobile communication device, the access controller is further configured to:
disassociate the mobile communication device from a point-of-access to which the mobile communication device is currently associated; and
transmit addressing information for the selected data stream from the point-of-access that can transmit the selected RF resource, when the mobile communication device has re-scanned the available RF resources and attempts to associate with the point-of-access that can transmit the selected RF resource.

19. The apparatus of claim 13, the server further configured to:
determine a first data stream for which demand amongst users of the mobile communication devices is likely to be higher than for other data streams;
determine a second data stream likely to be viewed simultaneously with the first data stream; and assign both the first and second data streams to an RF resource, whereby mobile communication devices receiving the RF resource will receive both the first and second data streams.

20. The apparatus of claim 13, wherein the server is further configured to:
- assign a plurality of data streams amongst RF resources, at least one of the plurality of data streams being assigned to at least two RF resources;
- receive a request from the mobile communication device for the selected data stream;
- identify points-of-access that cannot transmit one or more selected RF resources, the one or more selected RF resources being RF resources to which the selected data stream is assigned;

the access controller is further configured to instruct the points-of-access that cannot transmit the one or more selected RF resources to deny association to the mobile communication device; and the server is configured to multicast the selected data stream to the mobile communication device through a point-of-access that is configured to transmit one of the one or more selected RF resources.

* * * * *